(12) United States Patent  
Joseph

(10) Patent No.: US 6,971,640 B2  
(45) Date of Patent: Dec. 6, 2005

(54) SWAY BAR BUSHING

(75) Inventor: Jerry Joseph, Woodcliff Lake, NJ (US)

(73) Assignee: Research and Manufacturing Corporation of America, New Jersey City, NJ (US)

(*) Notice: Subject to any disclaimer, the term of this patent is extended or adjusted under 35 U.S.C. 154(b) by 168 days.

(21) Appl. No.: 10/420,051

(22) Filed: Apr. 18, 2003

(65) Prior Publication Data

US 2004/0207135 A1    Oct. 21, 2004

(51) Int. Cl.[7] ................................................ F16F 7/00
(52) U.S. Cl. ........................ 267/141; 267/33; 267/257
(58) Field of Search .................... 267/141.1–141.4, 267/33, 153, 196, 140.4, 292, 293, 257, 258, 267/141; 248/560, 615, 632–634

(56) References Cited

U.S. PATENT DOCUMENTS

| | | | |
|---|---|---|---|
| 3,275,313 A | 9/1966 | Hoenick | |
| 3,315,952 A | 4/1967 | Vittone | |
| 3,448,994 A | 6/1969 | King et al. | |
| 4,750,757 A | 6/1988 | Long | |
| 4,854,766 A | 8/1989 | Hein | |
| 4,951,962 A | 8/1990 | Tomida et al. | |
| 5,112,031 A * | 5/1992 | Hynds et al. | 267/276 |
| 5,118,070 A | 6/1992 | Reid | |
| 5,290,018 A * | 3/1994 | Watanabe et al. | 267/293 |
| 5,565,251 A | 10/1996 | Tang et al. | |
| 5,743,987 A | 4/1998 | Tang et al. | 156/244.1 |
| 6,536,594 B2 * | 3/2003 | Hayashi | 248/632 |
| 6,845,995 B2 * | 1/2005 | Cai et al. | 280/124.169 |

FOREIGN PATENT DOCUMENTS

KR    1999-369376    *    7/1999

* cited by examiner

Primary Examiner—Pam Rodriguez  
(74) Attorney, Agent, or Firm—Lackenbach Siegel, LLP

(57) ABSTRACT

An elastomeric sway bar bushing provides an improved and secure fit between a retention bracket and a motor vehicle sway bar under extreme temperature and mechanical conditions. Tab sections, ring sections, and a convex stability ridge extend from the bushing and firmly lock the bushing to both the retention bracket and the sway bar while maintaining ease of assembly, minimizing debris buildup, resisting thermal degradation. The ring sections serve an additional sacrificial function and maintain surface contact with the sway bar beyond the limits of the retention bracket.

9 Claims, 3 Drawing Sheets

SWAY BAR BUSHING

BACKGROUND OF THE INVENTION

1. Field of the Invention

The present invention relates to a sway bar bushing. More specifically, the present invention relates to a sway bar bushing used to securely mount a stabilizer bar to a frame of a motor vehicle.

2. Description of the Related Art

Conventionally, the frame of a motor vehicle cohesively links a vehicle's tires through control arms to the vehicle's body. During vehicle motion along a curve, centrifugal forces urge the vehicle's mass to continue moving in a straight line, away from the direction of the curve. This centrifugal force causes the vehicle to sway, placing compressive force on the outer control arms and expansive force on the inner control arms relative to the center of the curve.

Motor vehicles employ a stabilizer mechanism in an effort to reduce and control a vehicle's sway during turns and improve vehicle control. Coil springs, within the stabilizer mechanism, join the control arms to the frame. During vehicle sway, the outer coil springs (and hence the outer control arms) are placed in compression and move downward and the inner coil springs (and hence the inner control arms) are placed in tension and move upward.

A sway bar (stabilizer bar) also within the stabilizer mechanism, links the inner and outer control arms. During vehicle sway, the sway bar receives upward movement on the outer side which is carried rotationally downward on the inner side causing axial rotation. As a consequence, the sway bar aids in ameliorating the sway motion of the vehicle and maintaining wheel contact with the road surface which correspondingly increases vehicle safety and controllability.

For a description of the general operation of a sway bar (stabilizer bar) and a sway bar bushing reference is made to U.S. Pat. No. 5,118,070, which is incorporated herein by reference.

In conventional use, a sway bar typically has a smooth cylindrical surface and is mounted to the vehicle frame with a U-shaped bracket, having an arcuate surface joining two planar sides. Related monolithic elastomeric bushings have a bore similar in size to the outer diameter of the sway bar and loosely surround the sway bar along a bushing/sway bar interface after assembly. Bolts, passing through the U-shaped bracket substantially compresses the elastomeric bushing, mold the bushing to the outer surface of the sway bar, and generally secure the sway bar to the frame. Conventional plastic forming methods are used to create elastomeric bushings.

In the related art, the sway bar bushing receives substantial lateral, torsional, and rotational force from the sway bar and often twists and moves within a U-shaped bracket. Under detrimental conditions, sway bar bushings have shifted laterally away from the bracket allowing a sway bar to loosely rattle between the bracket and the frame. This type of event, if not immediately cured, creates costly damage to the sway bar, the bracket, and the frame.

During use, lateral movement and axial rotation of the sway bar urges the sway bar bushing away from the U-shaped bracket and, as noted above, may displace the bushing causing vehicle damage. During assembly, the related art substantially compresses the bushing in an effort to prevent this displacement and retain the bushing within the U-shaped bracket. This undue compression causes distortion and strain in the bushing and the elastomeric compound which further intensifies premature thermal degradation. The undue compression also squeezes portions of the bushing out of the U-shaped bracket and risks opening a sway bar/bushing interface for easy debris entry.

Conventional designs provide an expansion slot in a position which remains exposed after installation. Road and automotive debris enter along the exposed expansion slot and ultimately debris access to the center of the bushing and sway bar. These debris cause mechanical degradation to the sway bar and bushing through scraping and cutting. Debris also causes chemical degradation to the sway bar and bushing through oxidation/reduction reactions. Consequently, it is important to minimize debris entry along any expansion slot and sway bar/bushing interface. Related art designs fail to appreciate this concern and often place an expansion slot where it is immediately vulnerable.

It is also important to prevent the sway bar bushing from separating from its retention bracket during vehicle motion. Related art designs allow the soft sway bar bushing to shift torsionally along the sway bar or allow the sway bar bushing to rotate within the bracket. Any shift in the relative positions of sway bar bushing and retention bracket provides gaps for debris entry which limits unit lifetime.

The related art designs also generally provide a sharp flush interface between the surface of the sway bar and the face of the monolithic sway bar bushing. Through wear and degradation, or under sway bar torsion, this interface angle may wear, become acute, or may open altogether thereby detrimentally minimizing the length of the bushing/sway bar interface and aiding the buildup of abrasive road debris at the interface. Since any debris trapped between the sway bar bushing and the sway bar is urged inward at each motion it is important to minimize initial debris entry. Related art designs fail to design an elastic interface between the monolithic sway bar bushing and the sway bar and consequently fail to minimize initial debris entry.

Conventional stabilizer mechanisms frequently place sway bar bushings in locations which receives high temperature from the catalytic converter. This increased temperature prematurely degrades and embrittles the sway bar bushing particularly at the location of greatest stress, where the outer diameter of the sway bar enters the and exits the monolithic bushing.

Related elastomeric members are selected from soft elastomeric materials such as natural rubber, butyl rubber, non-polar rubber compounds or ethylene propylene diene monomer elastomer having low unit densities which provide a soft and compressibly elastic fit between the U-shaped bracket and the sway bar. The conventional type of softer elastomer material exposes conventional bushings to thermal damage and undesirable rotational movement after assembly. Extreme temperatures (adjacent a vehicle catalytic converter) damage bushings made from soft conventional materials. In time conventional sway bar bushing degrade, are easily displaced, and allow the sway bar to contact the retaining bracket or frame member.

In view of the foregoing, there is a need for a sway bar bushing design which provides improved fit between the bracket, sway bar, and frame. There also a need for a sway bar bushing design which provides increased resistance to thermal breakdown, absorbs vibration, resists debris penetration along the bushing/bar interface, and has an increased life span.

OBJECTS AND SUMMARY OF THE INVENTION

An object of the present invention is to provide a sway bar bushing that overcomes the problems and difficulties described above.

It is another object of the present invention to provide a sway bar bushing which provides a custom fit between a retaining bracket, a frame member, and a sway bar.

It is another object of the present invention to provide a sway bar bushing which increases bushing and mounting assembly life.

It is another object of the present invention to provide a sway bar bushing which prevents debris and moisture access to a bushing slot and a sway bar/bushing interface.

It is another object of the present invention to provide a sway bar bushing which resists lateral, torsional, or rotational forces during extended use.

It is another object of the present invention to provide a sway bar bushing for a vehicle which provides enhanced thermal resistance to structural breakdown by minimizing an overall profile relative to a frame member and bracket while retaining uniform elastic support on a top and a bottom of a sway bar.

Briefly stated, the present invention relates to a sway bar bushing that provides an improved fit between a retention bracket and a motor vehicle sway bar under extreme temperature and mechanical conditions. Tab sections, ring sections, and a convex stability ridge extend from the bushing and firmly lock the bushing to both the retention bracket and the sway bar while maintaining ease of assembly, minimizing debris buildup, resisting thermal degradation and increasing life-span. The ring sections serve an additional sacrificial function and maintain surface contact with the sway bar beyond the limits of the retention bracket.

According to an embodiment of the present invention there is provided a sway bar bushing, formed to receive and secure a sway bar to a frame member with a bushing bracket, the bushing bracket including a pair of retaining tabs on each of a bracket front surface and a bracket back surface, and a convex stability slot extending on a bracket top surface, the sway bar bushing comprising: an elastomeric member defining an axial hole, a pair of locking tab sections on each of a bushing front side and a bushing rear side proximate the respective pairs of retaining tabs, the pairs of locking tab sections locking the elastomeric member between the retaining tabs and preventing a rotational slippage of the bushing, a slot penetrating the bushing along one of the pairs of locking tab sections and providing sway bar access to the axial hole during an assembly, a pair of ring sections on each of the bushing front side and the bushing rear side, and the ring sections bounding the axial hole and joining the pairs of locking tab sections to provide a continuous seal with the sway bar during the assembly, whereby a debris penetration and the rotational slippage is eliminated.

According to another embodiment of the present invention there is provided, a sway bar bushing, further comprising: a convex stability ridge on a top side of the elastomeric member fitting tightly within the convex stability slot and preventing a lateral slippage of the bushing relative to the bushing bracket during a use of the bushing.

According to another embodiment of the present invention there is provided, a sway bar bushing, further comprising: a pair of entry surfaces on an outer edge of the slot, whereby the pair of entry surfaces facilitates an insertion of the sway bar into slot and the axial bore during the assembly.

According to another embodiment of the present invention there is provided, a sway bar bushing, wherein: the elastomeric member is a composition including polypropylene and rubber, wherein the composition is resistive to a chemical and a thermal degradation during a use of the bushing.

According to another embodiment of the present invention there is provided, a sway bar bushing, wherein: a ratio of a first thickness, defined between an inner diameter of the axial hole and the top side of the elastomeric member, and a second thickness between the inner diameter and a bottom side of the elastomeric member, is between 0.85 and 1.15, thereby enabling a uniform compressive and retention force to the sway bar during the assembly.

According to another embodiment of the present invention there is provided, a sway bar bushing, comprising: an elastomeric member defining an axial hole, a convex stability ridge on a top side of the elastomeric member, a pair of locking tab sections on each of a bushing front side and a bushing rear side, a slot in the bushing along one of the pairs of locking tab sections providing sway bar access to the axial hole during an assembly with an external sway bar, a pair of ring sections on each of the bushing front side and the bushing rear side, and the ring sections bounding the axial hole and joining respective the pairs of locking tab sections to provide a continuous seal with the external sway bar during the assembly, whereby a debris penetration and a lateral and a rotational slippage relative to an external bracket is eliminated.

According to another embodiment of the present invention there is provided a sway bar bushing, formed to receive and secure a sway bar to a frame member with a bushing bracket, the bushing bracket including a pair of retaining tabs on each of a bracket front surface and a bracket back surface, and a convex stability slot extending on a bracket top surface, the sway bar bushing comprising: an elastomeric member defining an axial hole, a pair of locking tab sections on each of a bushing front side and a bushing rear side proximate the respective pairs of retaining tabs, the pairs of locking tab sections locking the elastomeric member between the retaining tabs and preventing a rotational slippage of the bushing, a slot penetrating the bushing along one of the pairs of locking tab sections and providing sway bar access to the axial hole during an assembly, and the pairs of locking tab sections preventing a rotational slippage of the bushing relative to the bracket during a use of the sway bar bushing.

According to another embodiment of the present invention there is provided, a sway bar bushing, further comprising: a convex stability ridge on a top side of the elastomeric member fitting tightly within the convex stability slot and preventing a lateral slippage of the bushing relative to the bushing bracket during the use.

According to another embodiment of the present invention there is provided, a sway bar bushing, further comprising: a pair of ring sections on each of the bushing front side and the bushing rear side, and the ring sections bounding the axial hole and joining the pairs of locking tab sections and providing a continuous seal with the sway bar during the assembly, whereby a debris penetration around the axial hole is eliminated.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
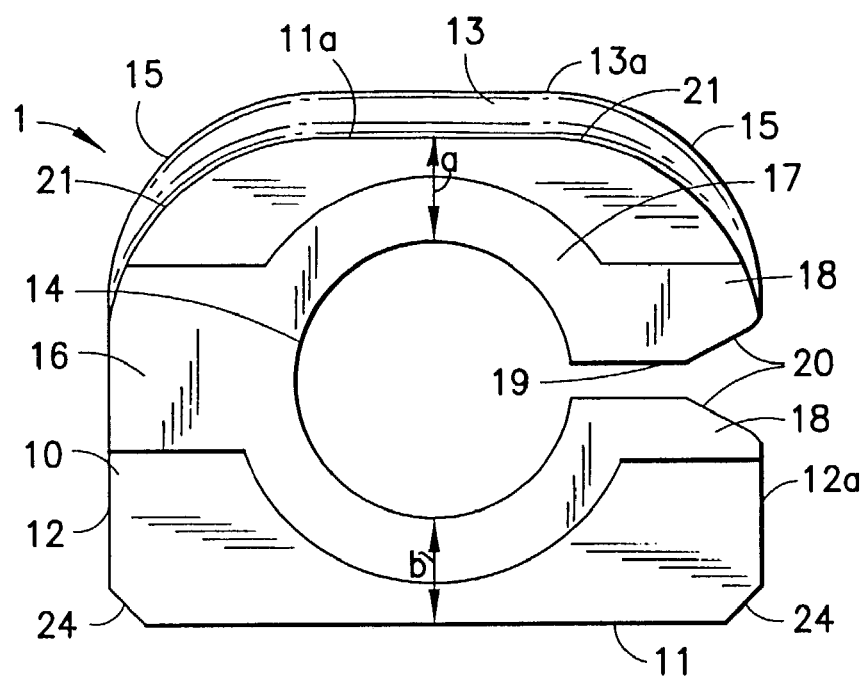
FIG. 1 is a side view of a sway bar bushing
Figure 2:
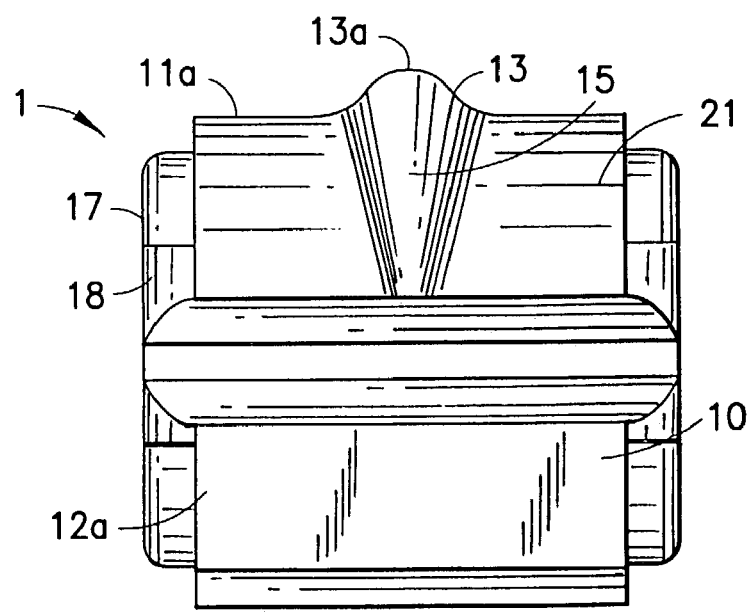
FIG. 2 is a front view of a sway bar bushing.

Referring now to FIGS. 1 and 2, a sway bar bushing 1 is an elastomeric member 10 having a bottom surface 11, a top surface 11a, and an inner diameter 14 defining an bore having a central axis (not shown). A side surface 12 and a slot-side surface 12a are generally perpendicular to bottom surface 11 and top surface 11a. A pair of bottom chamfers 24, 24 join planar bottom surface 11 with side surface 12 and slot-side surface 12a respectively.

Top surface 11a is parallel to bottom surface 11. A pair of curved sections 21, 21 join each side of top surface 11a with side surface 12 and slot-side surface 12a respectively. A convex stability ridge 13 extends upwards from top surface 11a, as shown. A pair of upper radii 15, 15 join opposite ends of stability ridge 13 with side surface 12 and slot-side surface 12a respectively.

A slot 19, opposite side surface 12, connects inner diameter 14 with slot-side surface 12a. A pair of entry surfaces 20, 20 join each side of slot 19 with slot side surface 12a. Entry surfaces 20, 20 allow simple and speedy assembly, as will be described. Entry surfaces 20 may have either a curved or planer form (as shown). In a preferred embodiment (as shown), entry surfaces 20, 20 are planer and have similar but reciprocal slopes relative to slot side surface 12a. In the unassembled state shown in FIGS. 1 and 2, slot 19 has a very narrow opening.

A distance a defined from top surface 11a to an upper central point of inner diameter 14 is similar to a distance b defined from bottom surface 11 to a bottom central point of inner diameter 14. A ration of distance a to distance b is from 0.85 to 1.15.

A first pair of tab sections 16, 16, project outward from a respective a front and rear (shown not labeled) face of sway bar bushing 1. Tab sections 16, 16 extend between side surface 12 and inner diameter 14 and secure sway bar bushing 1 to a bracket, as will be described.

A second pair of tab sections 18, 18 project outward from the front and rear (not shown) face of sway bar bushing 1. Tab sections 18, 18 extend on either side of slot 19 between slot-side surface 12a and inner diameter 14, as shown and secure sway bar bushing 1 to a bracket, as will be described.

A set of ring sections 17, 17 also project from respective the front and rear (not shown) faces of sway bar bushing 1. Ring sections 17, 17 join respective tab sections 16, 18 around the circumference of inner diameter 14. Ring sections 17, 17 provide a transition between the sway bar and the front and rear faces of sway bar bushing 1. Ring sections 17, 17 provide a secure seal to a sway bar (shown later) during vehicle movement, as will be described.

Sway bar bushing 1 is formed from an elastomeric material having a density selected to resist thermal breakdown and prevent undue mechanical deformation while maintaining a secure and snug fit between a sway bar, a bracket, and a vehicle frame member, as will be described.

In a preferred embodiment, sway bar bushing 1 is formed from elastomeric member 10 consisting of a hard combination of polypropylene and rubber which provides a dense yet resilient bushing capable of resisting thermal and mechanical breakdown while maintaining secure contact and a tight fit with a sway bar. Due the unique design and secure fit of the present invention, elastomeric member 10 does not create squeaking noises during use.

Figure 3:
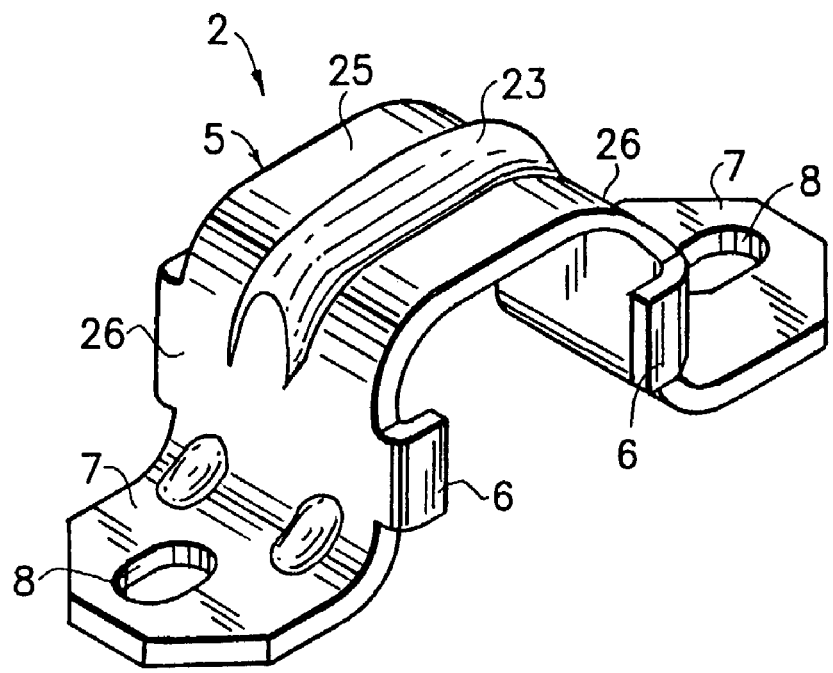
FIG. 3 is a front perspective view of a sway bar bushing and a conventional retention bracket.
Figure 3:
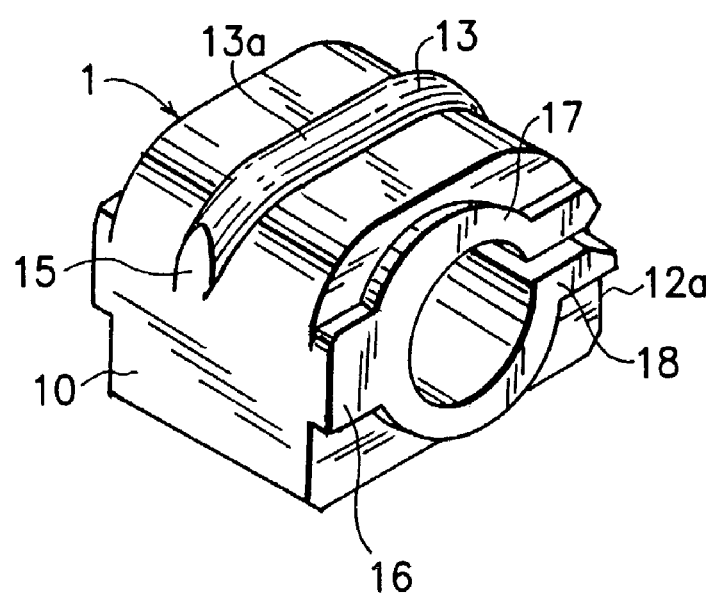

Referring now to FIG. 3, a mounting assembly 2 includes sway bar bushing 1 and a bushing bracket 5. Bushing bracket 5 includes a planar bracket top surface 25 and a pair of bracket side surfaces 26, 26. A pair of planar wings 7, 7 extend from respective bracket side surfaces 26, 26 generally parallel to top surface 25. A hole 8 on each wing 7 enables attachment to vehicle frame member, as will be described.

A convex stability slot 23 extends upward from planar bracket top surface 25, away from wings 7, 7. Stability ridge 13 seats firmly within convex stability slot 23 and locks sway bar bushing 1 within bushing bracket 5.

A pair of retaining tabs 6, 6 extend from a front and a rear surface of bushing bracket 5. Tab sections 16, 16 and 18, 18 firmly engage respective retaining tabs 6, 6 on each surface of bushing bracket 5 and lock sway bar bushing 1 within bushing bracket 5.

Figure 4:
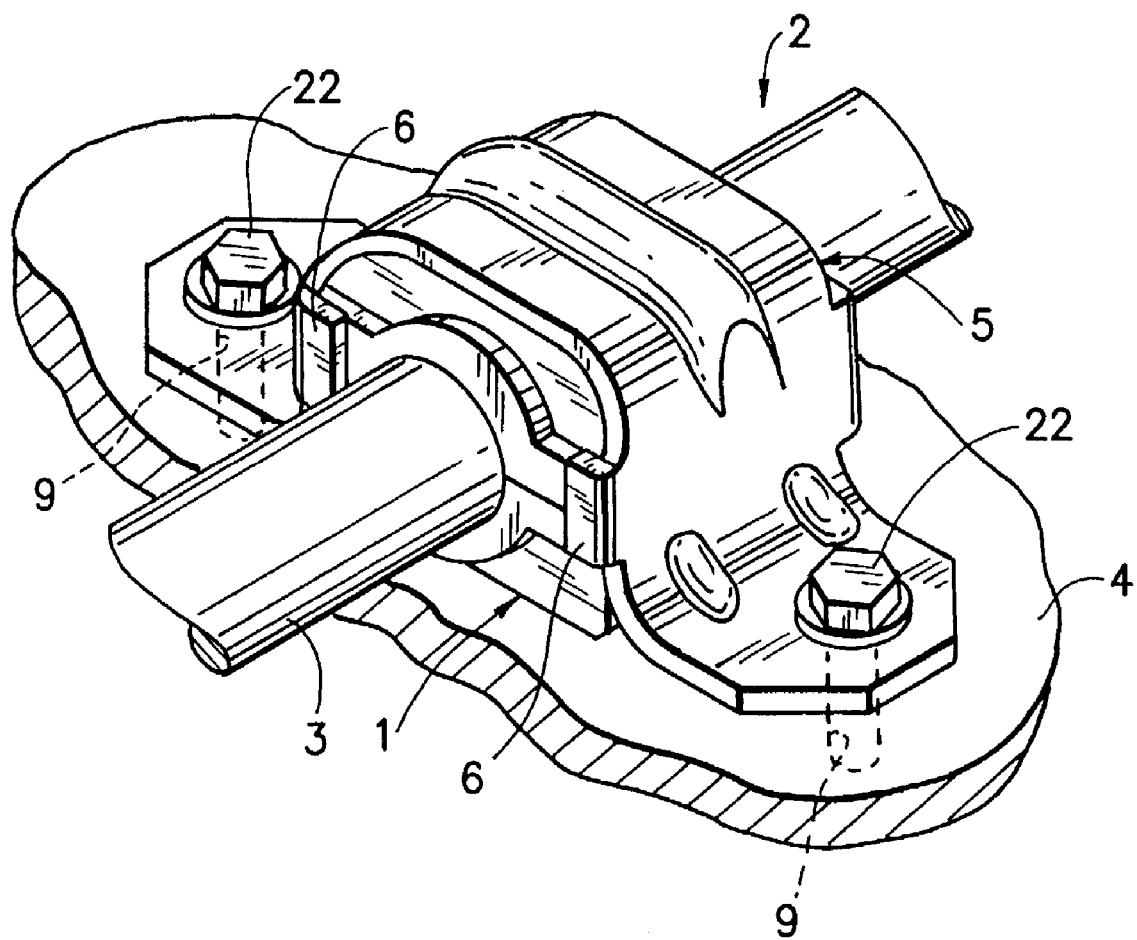
FIG. 4 is a detailed side view of an assembly including a sway bar bushing and a conventional retention bracket.

Referring now to FIG. 4, a sway bar 3, extends through inner diameter 14 in sway bar bushing 1. A pair of bolts 22, 22 extend through respective bracket holes 8, 8, lock into adjacent frame holes 9, 9, and fix mounting assembly 2 to a frame member 4. In this manner, the present invention provides an easy way to quickly and securely fix sway bar 3 to bushing bracket 5 and frame member 4.

During an initial assembly phase, an operator presses entry surfaces 20 against an outer surface of sway bar 3 with sufficient force to elastically open slot 19 and allow sway bar 3 to seat within inner diameter 14. In the initial assembly inner diameter 14 contacts nearly the entire radial surface of sway bar 3 within elastomeric member 10.

At an intermediate phase of assembly, the operator firmly presses bushing bracket 5 over sway bar bushing 1 and seats stability ridge 13 within stability slot 23. Simultaneously tab sections 16, 18 engage respective retaining tabs 6, 6 and positively lock elastomeric member 10 into bushing bracket 5 forming mounting assembly 2. In this condition planar top surface 11a contacts the planar top surface of bushing bracket 5. As sway bar bushing 1 enters bushing bracket 5, the slight compression provided by the operator closes slot 19 allowing sway bar bushing 1 to contact and seal the entire radial surface of sway bar 3. At a final stage of assembly, an operator inserts bolts 22, 22 through bracket holes 8, 8 and secures mounting assembly 2 to frame member 4. Further compression of sway bar bushing 1 is not required during assembly due to the density of elastomeric member 10.

Retaining tabs 6, 6 cover respective entry surfaces 20, 20, slot 19 and the opposite faces of slot 19. Consequently debris entry to the sway bar/bushing interface along inner diameter 14 is eliminated along slot 19 and entry surfaces 20, 20. The design of the present invention, positions slot 19 in this manner and minimizes debris and moisture entry. Minimizing debris and moisture entry prevents subsequent mechanical break down of sway bar bushing 1 or sway bar 3 through friction, scraping, or chemical reaction. Consequently, the present invention improves the life span of sway bar bushing 1, mounting assembly 2, and sway bar 3 while providing complete support during vehicle operation.

Since retaining tabs 6, 6, cover respective tab sections 16, 18 on each face of sway bar bushing 1, any stress damage or surface cracking caused during assembly protected and further degradation is eliminated. This feature of the present invention further increases the operational life of sway bar bushing 1.

Ring sections 17, 17 project from the front and rear face of sway bar bushing 1, beyond the support provided by the edges of bushing bracket 5, as shown. Ring sections 17, 17 beneficially extend the supportive and sealing surface contact with sway bar bushing 3 and further aid in resisting debris penetration and thermal breakdown.

Ring sections 17, 17 extend beyond the outer boundaries of monolithic sway bar bushing 1, and are the first elastomeric sections subject to elastic twist, or lateral or axial movement of sway bar 3. The present design provides several important benefits. Since ring sections 17, 17 are not held rigidly in the main body of sway bar bushing 1, they easily and elastically respond to maintain a close seal with sway bar 3 during any motion while extending beyond the main body and providing additional support and vibratory absorption. Since ring sections 17, 17 have a small cross section and are unsupported by bushing bracket 5, they also absorb and vent heat more rapidly than internal sections of sway bar bushing 1. This design also allows ring sections 17, 17 to serve as sacrificial bushing sections and replacement indicators since ring sections 17, 17 fail before allowing failure of the central monolithic sway bar bushing 1.

The present design greatly increases the stability of sway bar bushing within mounting assembly 2. Since tab sections 16, 18 positively engage respective retaining tabs 6, 6 and since stability ridge 13 positively engages stability slot 23, the design of the present inventions prevents sway bar bushing 1 from shifting laterally, axially, or in rotation relative to sway bar 3. As an additional design feature, since top surface 11a, bottom surface 11, and side surfaces 12, 12a are substantially planar, elastomeric member 10 is easily retained by the respective top and side walls of bushing bracket 5. Thus, the planar surfaces of sway bar bushing 1 provide back-up stability in addition to the features noted above. In this manner, the present design both eliminates damaging movement between sway bar bushing 1, bushing bracket 5, and frame member 4. Consequently, the present design improves the life span of the sway bar bushing and the entire mounting assembly.

After mounting assembly 2 is secured to frame member 4, the ratio of distance a to distance b generally remains the same, and consequently the retaining pressure exerted against sway bar 3, opposite the upper and lower points on inner diameter 14, is uniform. This similarity in retention force provides uniformity of fit, uniform response to thermal gradients, and uniform response to the motion of sway bar 3. This similarity in retention force also means that sway bar 3 receives the same elastic cushioning in either direction relative to frame member 4. It also means that installation force is minimized so that damage due to over compression is eliminated. The fit of sway bar bushing 1 with sway bar 3 also improves the operable life of sway bar bushing 1 by balancing the compression exerted on each side of elastomeric member 10.

It should also be understood by one skilled in the art that the present invention is not limited to two tab sections 16, 18 on each side of inner diameter 14, proximate respective retaining tabs 6, 6. At least one additional tab (not shown) may be provided between tab sections 16, 18 on the top side of sway bar bushing 1, adjacent stability ridge 13. An additional tab section, corresponding to an additional retaining tab on bushing bracket 5 would provide additional resistance to torsion and rotation.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A sway bar bushing, formed to receive and secure a sway bar to a frame member with a bushing bracket, said bushing bracket including a pair of retaining tabs on each of a bracket front surface and a bracket back surface, and a convex stability slot extending on a bracket top surface, said sway bar bushing comprising:
    an elastomeric member defining an axial hole;
    a pair of locking tab sections on each of a bushing front side and a bushing rear side proximate said respective pairs of retaining tabs;
    said pairs of locking tab sections locking said elastomeric member between said retaining tabs and preventing a rotational slippage of said bushing;
    a slot penetrating said bushing along and between said pair of locking tab sections and providing sway bar access to said axial hole during an assembly;
    a pair of ring sections on each of said bushing front side and said bushing rear side; and
    said ring sections bounding said axial hole and joining said pairs of locking tab sections to provide a continuous seal with said sway bar during said assembly, whereby a debris penetration and said rotational slippage is eliminated.

2. A sway bar bushing, according to claim 1, further comprising;
    a convex stability ridge on a top side of said elastomeric member fitting tightly within said convex stability slot and preventing a lateral slippage of said bushing relative to said bushing bracket during a use of said bushing.

3. A sway bar bushing, according to claim 2, further comprising:
    a pair of entry surfaces on an outer edge of said slot, whereby said pair of entry surfaces facilitates an insertion of said sway bar into said slot and said axial bore during said assembly.

4. A sway bar bushing, according to claim 1, wherein said elastomeric member is a composition including polypropylene and rubber, wherein said composition is resistive to a chemical and a thermal degradation during a use of said bushing.

5. A sway bar bushing, according to claim 2, wherein: a ratio of a first thickness, defined between an inner diameter of said axial hole and said top side of said elastomeric member, and a second thickness between said inner diameter and a bottom side of said elastomeric member, is between 0.85 and 1.15, thereby enabling a uniform compressive and retention force to said sway bar during said assembly.

6. A sway bar bushing, comprising:
    an elastomeric member defining an axial hole;
    a convex stability ridge on a top side of said elastomeric member;
    a pair of locking tab sections on each of a bushing front side and a bushing rear side;
    a slot in said bushing along and between locking tab sections of one of said pairs and providing sway bar access to said axial hole during an assembly with an external sway bar;

a pair of ring sections on each of said bushing front side and said bushing rear side; and said ring sections bounding said axial hole and joining respective said pairs of locking tab sections to provide a continuous seal with said external sway bar during said assembly, whereby a debris penetration and a lateral and a rotational slippage relative to an external bracket is eliminated.

7. A sway bar bushing, formed to receive and secure a sway bar to a frame member with a bushing bracket, said bushing bracket including a pair of retaining tabs on each of a bracket front surface and a bracket back surface, and a convex stability slot extending on a bracket top surface, said sway bar bushing comprising:

an elastomeric member defining an axial hole;

a pair of locking tab sections on each of a bushing front side and a bushing rear side proximate said respective pairs of retaining tabs;

said pairs of locking tab sections locking said elastomeric member between said retaining tabs and preventing a rotational slippage of said bushing;

a slot penetrating said bushing along and between said pair of locking tab sections and providing sway bar access to said axial hole during an assembly; and said pairs of locking tab sections preventing a rotational slippage of said bushing relative to said bracket during a use of said sway bar bushing.

8. A sway bar bushing, according to claim 7, further comprising:

a convex stability ridge on a top side of said elastomeric member fitting tightly within said convex stability slot and preventing a lateral slippage of said bushing relative to said bushing bracket during said use.

9. A sway bar bushing, according to claim 8, further comprising:

a pair of ring sections on each of said bushing front side and said bushing rear side; and said ring sections bounding said axial hole and joining said pairs of locking tab sections and providing a continuous seal with said sway bar during said assembly, whereby a debris penetration around said axial hole is eliminated.

* * * * *